United States Patent [19]

Kogge

[11] 4,085,448
[45] Apr. 18, 1978

[54] DATA COMMUNICATION BUS STRUCTURE

[75] Inventor: Peter Michael Kogge, Endicott, N.Y.

[73] Assignee: International Business Machines Corporation, Armonk, N.Y.

[21] Appl. No.: 729,516

[22] Filed: Oct. 4, 1976

[51] Int. Cl.² .......................... H04Q 3/58; H04Q 1/30; G06F 1/00
[52] U.S. Cl. .................................. 364/900; 340/147 R
[58] Field of Search .............................. 364/200, 900; 340/146.1 C, 147 R, 147 LP; 235/153 AK

[56] References Cited

U.S. PATENT DOCUMENTS

| | | | |
|---|---|---|---|
| 3,517,171 | 6/1970 | Avizienis | 364/200 |
| 3,585,595 | 6/1971 | Slavin | 340/147 X |
| 3,681,761 | 8/1972 | Schuenemann | 364/200 |
| 3,710,324 | 1/1973 | Cohen | 364/200 |
| 3,916,177 | 10/1975 | Greenwald | 235/153 AK |
| 3,921,141 | 11/1975 | Wilber | 235/153 AK |
| 3,932,841 | 1/1976 | Deerfield | 364/200 |
| 3,943,494 | 3/1976 | Holmes, Jr. | 364/200 |
| 3,978,451 | 8/1976 | Ito | 340/147 LP |
| 3,988,714 | 10/1976 | Bardotti | 340/146.1 C |

Primary Examiner—James D. Thomas
Attorney, Agent, or Firm—Paul M. Brannen

[57] ABSTRACT

A data communication bus structure where all module-to-module control information is grouped into two sets of lines, defined as sub-buses, wherein signal contents of the sub-buses change only at well-defined times, under the control of two other lines which themselves simply govern the transfer of control information relative to the communication. The bus structure is symmetrical with one type of each line driven by each of the two modules involved in the communication. Arbitrary standard error detecting/correcting encodings may be used on the bus to overcome possible bus failures with no change to the basic bus communications protocol.

An independent bus monitor observes all communications over the bus, observes when an improper signaling exchange takes place, and isolates the module most responsible for the fault. Also, there is provided a simple and standard programmable interface unit which can be used to generate the appropriate control information and signaling protocol for a module that is to be tied to the bus.

3 Claims, 13 Drawing Figures

DATA COMMUNICATION BUS STRUCTURE

BACKGROUND OF THE INVENTION

A. Field of the Invention

This invention relates to data communication bus structures, and particularly to an improved method of controlling a data communications bus which provides improved fault tolerance provisions.

B. Description of the Prior Art

The following prior art provides useful background information for the present invention:

(1) An article entitled "A Systematic Approach to the Design of Digital Busing Structures", by K. Thurber and E. Jensen, published in the 1972 Proceedings of the Fall Joint Computer Conference beginning at page 719.

(2) IBM Technical Disclosure Bulletin, Volume 12, Number 1, June 1969, page 163, entitled "Line Adapter Configuration for Fault Location".

(3) IBM Technical Disclosure Bulletin, Volume 9, Number 5, October 1966, page 454, entitled "Automatic Channel Switching".

(4) IBM Technical Disclosure Bulletin, Volume 8, Number 3, August 1965, page 393, entitled "Real Time Checking of Selector Channel Sequence Controls by Time Shared Central Processor Sequence Controls".

(5) U.S. Pat. No. 3,351,905 for "Error Checking Method and Apparatus", granted to D. Kramer on Nov. 7, 1967.

(6) U.S. Pat. No. 3,434,115 for "Timed Operation Sequence Controller", granted to J. S. Chomicki on March 18, 1969.

(7) U.S. Pat. No. 3,517,171 for "Self-Testing and Repairing Computer", granted to A. A. Avizienis on June 23, 1970.

(8) U.S. Pat. No. 3,534,337 for "Data Acquisition Device", granted to H. Martin et al on Oct. 13, 1970.

(9) U.S. Pat. No. 3,536,902 for "Sequence Step Check Circuit", granted to A. S. Cochran et al on Oct. 27, 1970.

(10) U.S. Pat. No. 3,646,519 for "Method and Apparatus for Testing Logic Functions in a Multiline Data Communication System", granted to J. E. Wollum et al on Feb. 29, 1972.

(11) U.S. Pat. No. 3,648,256 for "Communications Link for Computers", granted to T. O. Paine et al on Mar. 7, 1972.

Reference (1) is a general discussion of digital busing structures, and does not contemplate a structure according to the present invention, particularly the use of four control sub-buses, two for control information and two for control timing. It also does not discuss any fault tolerant considerations.

Reference (2) deals with a communication line rather than a general digital bus structure. It does not check signaling on line and is not programmable, as is the present invention.

Reference (3) does not provide time-sensitive signaling as used in the present invention.

Reference (4) does not contemplate the use of separate sub-buses to provide control information and control signals.

Reference (5) is directed to an error checking method and apparatus which does not employ plural sub-buses, checking of bus signal timing or programmable interfaces, as found in the present invention.

Reference (6) is directed to a "timed operation sequence controller" and neither shows nor describes any interface unit or bus structure as disclosed and claimed herein.

Reference (7) shows a data processing system using bus monitors, but the monitors are merely error detectors for the error detecting data codes used in the system. No character validation or protocol timing check is provided, as it is in the present invention.

Reference (8) is directed to a data acquisition circuit, using common channels between a plurality of field locations and a central location, and does not contemplate sub-buses for both control information and control signals. Nor does it provide a unique monitoring system or an interface unit of the programmable type, as found in the present invention.

Reference (9) is directed to a sequence step checking circuit for a telephone switching system and is unrelated to data bus structures.

Reference (10) is directed to a system for checking operation of digital logic on command from a processor, whereas the present invention is directed to a continually operating checking system of all time signaling over a bus. Also, this reference does not disclose the use of a programmable interface unit.

Reference (11) is directed to a serial bus structure with some failure detection and retry procedures, whereas the present invention relates to general parallel bus structures having both control and data signals.

The prior art discussed above represents what applicant and his representatives personally and presently consider to be the best of the prior art presently known to them. No representation is made or intended, however, that better prior art does not exist, nor is any representation made or intended that the foregoing interpretations are the only interpretations that can be placed on this prior art.

SUMMARY OF THE INVENTION

It is accordingly a principal object of the present invention to provide an improved fault tolerant data bus structure.

Another object of the invention is to provide an improved data bus structure having a general communication protocol that is amenable to many purposes.

Still another object of the invention is to provide an independent checking module that can detect and isolate faulty communications on buses using the general protocol.

Still another object of the invention is to provide an improved programmable interface unit capable of converting from arbitrary signaling requirements to the general communication protocol.

Briefly described, the present invention provides a data bus structure where the module-to-module control information is grouped into two sets of lines or sub-buses for carrying what is termed the initiator and follower character information, which themselves are governed by two other lines termed the initiator and follower strobe lines. The bus structure is symmetrical with one type of each line driven by each of the two modules involved in the communication. Arbitrary and standard error detection and correction encodings may be used on the buses to overcome possible bus failures with no change to the basic bus communications protocol provided by this invention. For this bus structure, the invention provides a bus monitor which checks on the validity of the characters being transferred as well as on the timing of the control signals on the strobe lines.

There is also provided for the buses a programmable interface unit which utilizes preferably read only memories for governing the operation of the strobe and character sub-buses.

The foregoing and other objects, features and advantages of the invention will be apparent from the following more particular description of a preferred embodiment of the invention, as illustrated in the accompanying drawings.

DETAILED DESCRIPTION OF A PREFERRED EMBODIMENT

Figure 1:
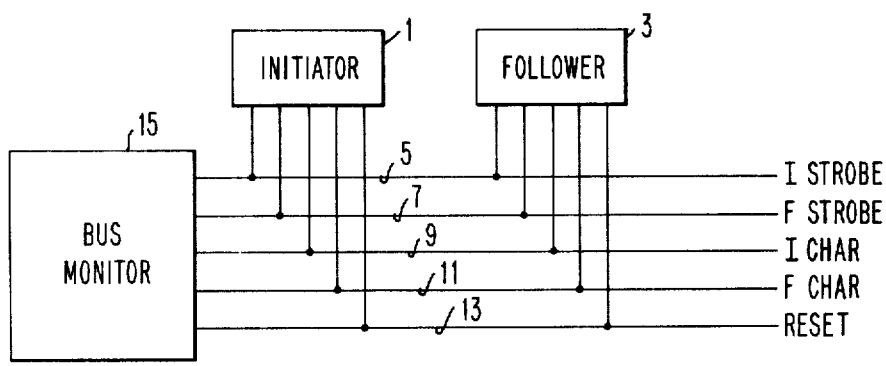
FIG. 1 is a highly schematic block diagram of the principal elements of an improved bus structure in accordance with this invention.

Referring to the drawings, FIG. 1 shows a minimal bus structure according to the present invention. Two modules which will interchange data are shown in FIG. 1 and are designated as the initiator module 1 and the follower module 3. In the description to follow, the initiator is the module that initiated the communication sequence and the follower module is the module that responds to the communication.

Coupling these two modules are at least five sub-buses 5, 7, 9, 11 and 13, further designated as ISTROBE, FSTROBE, ICHAR, FCHAR, and RESET. Sub-bus 5, designated ISTROBE for "initiator strobe", is a line which is driven by the initator module to signal the start and end of a single exchange sequence. Sub-bus 7, designated also FSTROBE for "follower strobe", is a line driven by the follower module to signal when commands from the initiator module have been accepted. Line or sub-bus 9, also designated ICHAR for "initiator character", is a sub-bus consisting of one or more lines all driven by the initiator module and which carries the information content that the initiator module wishes to transfer to the follower. Sub-bus 11, also designated as FCHAR for "follower character", is a sub-bus consisting of one or more lines all driven by the follower module and carries the follower module's information relative to its response to ICHAR signals. Line 13, also designated as "RESET", is a line driven by the bus monitor 15 which will be described later, to reset the bus interfaces also later described, to a known state when an error is detected.

Figure 2:
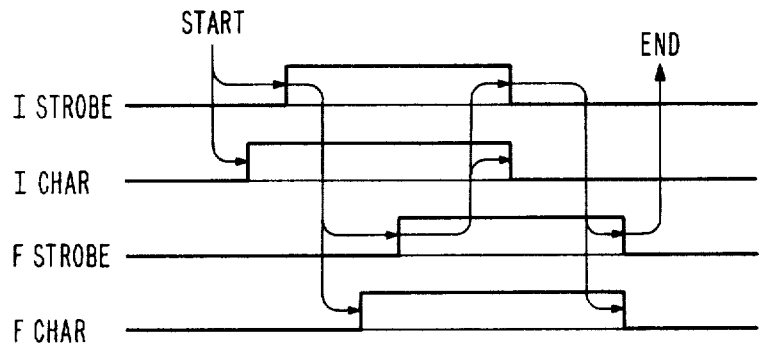
FIG. 2 is a timing diagram illustrating the time relationships of signals on the four signaling sub-buses.

The sequence diagram, shown in FIG. 2 of the drawings, illustrates the standard sequence for all bus communications for the arrangement shown in FIG. 1. The initiator module, when granted the bus, places the desired command on the ICHAR sub-bus and, after a short deskewing delay, raises the ISTROBE sub-bus, these two actions commencing the total sequence. The rise of ISTROBE triggers the follower module to accept ICHAR, perform or start the indicated operation and place some response on FCHAR. After another deskewing delay, the follower module raises FSTROBE. The rise of FSTROBE signals the initiator module to accept from FCHAR the follower's response and signal its acceptance by dropping ISTROBE. ICHAR may also be dropped at the same time as seen in FIG. 2. The fall of ISTROBE signals the follower module that FCHAR has been accepted. The follower module acknowledges this condition by dropping FSTROBE and FCHAR simultaneously, thereby ending the sequence. At the fall of FSTROBE, the bus is completely free, and the initiator module may restart the sequence with another command.

The ISTROBE and FSTROBE signals synchronize all communications on the bus and yet are totally independent of the exact information communicated over the bus. ICHAR and FCHAR contain all information relative to what the initiator module wants done and the responses of the follower module that are not involved with the actual timing of the information transfer. This is in marked contrast to many bus structures wherein the same bus lines are involved in both timing and information transfer.

The bus structure shown in FIG. 1 may be elaborated greatly without affecting the separation between timing and control. For example, although only one initiator module and one follower module are shown, multiple initiation modules and multiple follower modules sharing one bus are easily handled by well-known techniques whereby each initiator module activates a "bus request" line and begins its communication when a "bus grant" line back to that module is activated. Once granted the bus, part of the initiator module's communication information in ICHAR can be a follower identification code indicating which follower module should respond.

In most buses where the same lines carry both timing and information, the insertion of fault tolerant capabilities to detect and/or correct basic bus failures, such as broken connectors or failed bus drivers or receivers, is at best cumbersome. Most of the better techniques, such as error correcting codes, do not work well when the information being transferred is derived from the actual time sequence variations in various bus lines. The bus structure, illustrated in FIG. 1 and described above, is just the opposite. Since all of the bus timing is found in ISTROBE and FSTROBE, and ICHAR and FCHAR are observed under quiescent conditions, any of the standard error detecting or correcting codes can be applied to the information on ICHAR and FCHAR with no change in the basic signaling protocol illustrated in FIG. 2.

Similarly, since ISTROBE and FSTROBE contain no communication relevant information, they can be protected in any of several ways more suitable for timing signals, such as simple line duplication.

Figure 3:
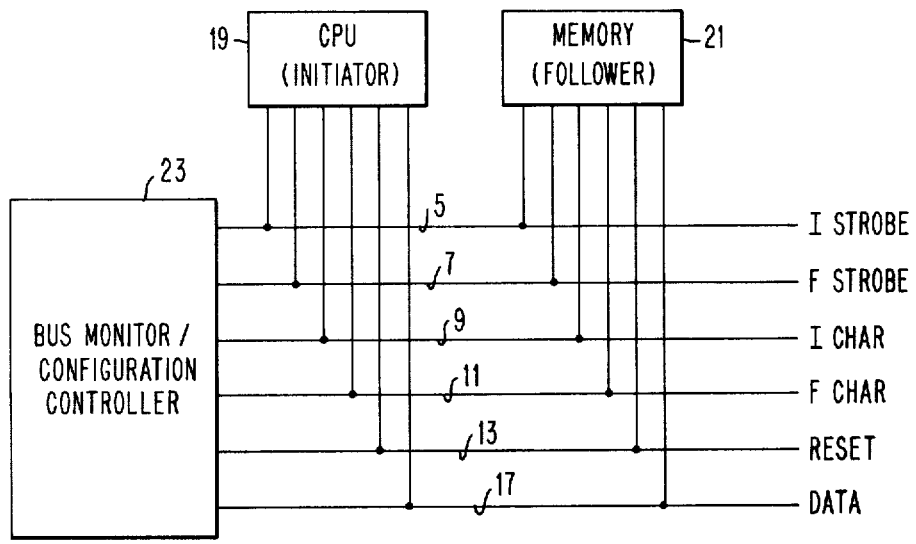
FIG. 3 is a more detailed block diagram of a particular application of the invention.

The structure shown in FIG. 1 is only a minimal bus structure corresponding to the present invention. Additional sub-buses can be added and controlled with no change to the basic signaling sequence. For example, a central processor unit may be tied to memory modules or input/output controllers via a bus structure that consists of the basic arrangement of FIG. 1 plus a bidirectional data bus. Such an arrangement is shown in FIG. 3 of the drawings. The timing and command information is carried on channels 5, 7, 9, 11 and 13, while the data bus 17 provides a wide path for the transfer of data in either direction between a CPU 19 and a memory 21, the operation being under the supervision of a bus monitor and configuration controller 23.

Figure 4:
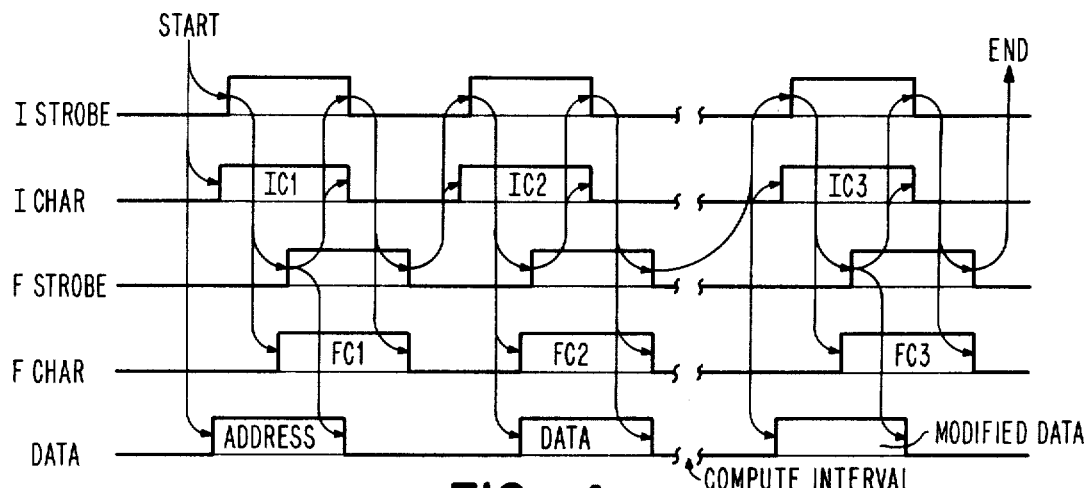
FIG. 4 is a timing diagram applicable to FIG. 3.

FIG. 4 of the drawings illustrates a signaling sequence for the configuration of FIG. 3 when the CPU, which is the initiator, wishes to perform a "read-compute-write" sequence where the memory module, which is the follower, will at CPU request pass a data word to the CPU, the CPU will modify it and return it to the memory, and the memory will write it back into the same location. The first information is the ICHAR item IC1, which carries the information "address on bus" which is present on the ICHAR line at the same time that the address data is supplied to the data line. Thereafter, the signal FC1 on the FCHAR line comes up, indicating "address accepted, read started". This is followed by the FSTROBE with both the FSTROBE and FCHAR signals terminating at the same time. Thereafter IC2 comes up, followed by ISTROBE, IC2 indicating "willing to accept data". FC2 comes up, followed by FSTROBE, FC2 indicating "data is on the data bus". The data information is supplied on the data line for the duration of the signal FC2. These three signals terminate simultaneously and thereafter the compute interval is taken, following which the modified data is present on the data bus for return to the memory. IC3 will now be present on the ICHAR line, indicating "modified data is on bus" followed by the ISTROBE signal. Thereafter, FC3 followed by FSTROBE occur, FC3 indicating "modified data accepted and write started". Termination of FSTROBE and FC3 end the sequence. It will be noted that all timing and synchronization for ICHAR, FCHAR and the data bus is derived from ISTROBE and FSTROBE and that three bus transfers use exactly the same signaling protocol but with different command information.

Figure 5:
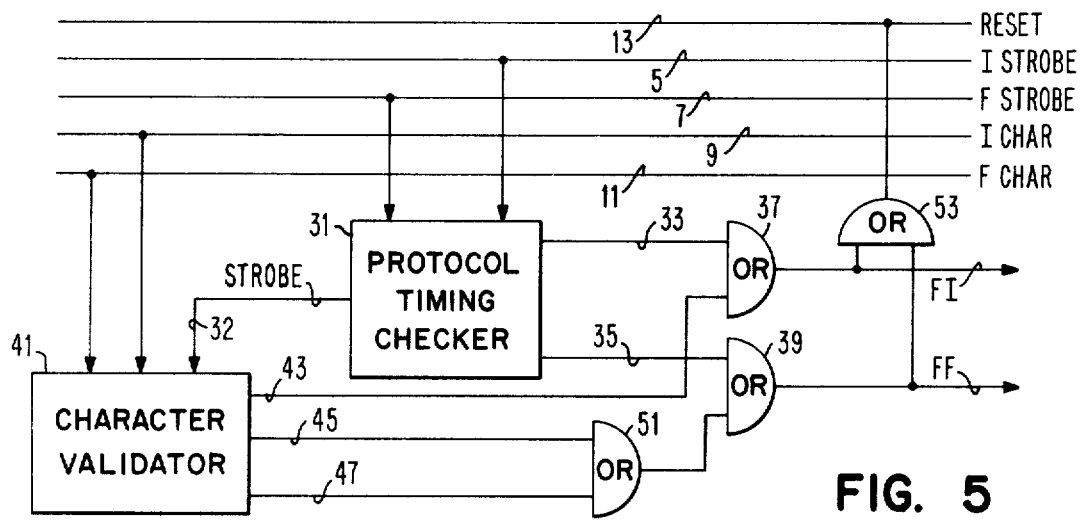
FIG. 5 is a block diagram showing the components of the bus monitor of FIG. 3.

The invention also contemplates specific bus monitoring apparatus which determines when errors in a bus communication sequence have occurred and which module is responsible for the error. FIG. 5 is a broad schematic block diagram of one configuration which may be employed. There are two subsections to this monitor, one to check the signaling protocol on ISTROBE and FSTROBE and one to check the validity of the commands on ICHAR and FCHAR.

The protocol timing checker 31 has inputs from the ISTROBE and FSTROBE lines 5 and 7, supplies an output signal on a line 32, also designated as STROBE, and also provides outputs on signal lines 33 and 35 to one input of OR circuits 37 and 39 respectively. The validity of the commands on the ICHAR and FCHAR lines is determined by the character validator 41, which receives inputs from the ICHAR and FCHAR lines 9 and 11 and the STROBE line 32 from the protocol timing checker 31, and provides output signals on lines 43, 45 and 47. Line 43 provides a second input to OR circuit 37, while lines 45 and 47 provide inputs to an OR circuit 51, the output of which is connected to the second input of OR circuit 39. The outputs of OR circuits 37 and 39 are connected to the inputs of an OR circuit 53, which provides an output to the reset bus 13. Also, the outputs of 37 and 39 are provided to lines designated as FI and FF, indicating faulty initiator and faulty follower conditions respectively.

An output on line 33 from the protocol timing checker 31 indicates an invalid initiator timing, while an output on line 43 of the character validator 41 indicates an invalid ICHAR. Either of these conditions will produce an output on the line FI indicating faulty initiator and also provide a signal to the reset bus 13. Line 45 provides an output indicating an invalid FCHAR and line 47 indicates an output indicating an invalid combination. Either of these conditions produces an output from OR circuit 51 and thence an output from OR circuit 39, indicating a faulty follower condition as well as when an output occurs on line 35 from the protocol timing checker 31. This will provide an output on the line FF and also, via OR circuit 53, will produce an output on the reset bus 13.

Figure 6:
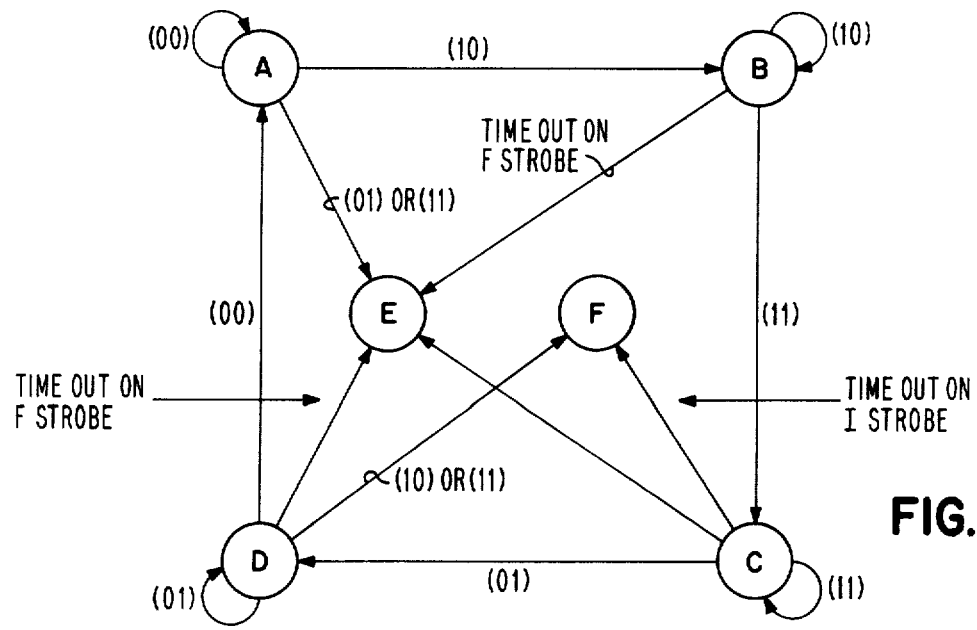
FIG. 6 is a state diagram showing the various states and transitions of the protocol timing checker 31 of FIG. 5.

FIG. 6 of the drawings illustrates a state diagram for the protocol timing checker 31, illustrating the various states and the state transitions which occur. Each of the circles indicated as A, B, C, D, E and F represent the possible states of the apparatus. Basically, states A, B, C and D represent the four possible combinations of values that ISTROBE and FSTROBE may take on, as follows. State A represents both ISTROBE and FSTROBE inactive. State B represents ISTROBE active and FSTROBE inactive. State C represents both ISTROBE and FSTROBE active. State D indicates ISTROBE inactive and FSTROBE active. State E indicates a follower fault and state F indicates an initiator fault. The binary numbers in parentheses and adjacent the arrows indicate the status of ISTROBE and FSTROBE that cause state transition.

State A is a normal quiescent state when there is no bus communication. A transition to state B occurs when ISTROBE is raised. State C is entered if FSTROBE is then raised. The fall of ISTROBE causes the transition to D, while the following fall of FSTROBE causes state A, the quiescent state, to be re-entered. Thus, the normal state sequence is A, B, C, D, A.

It will be apparent from FIG. 6 that any other sequence of ISTROBE and FSTROBE is improper and will cause the transition to either state E or state F, depending on the cause of the faulty sequence. Note also that in states B, C and D, the failure of ISTROBE or FSTROBE to change within certain time limits will also cause error indications. This feature provides detection against either the initiator or the follower module failing to react within a predetermined time. A more detailed diagram of the protocol timing checker will be described later.

Considering the character validator 41, its primary purpose is to verify that the command characters transferred over ICHAR and FCHAR sub-buses are each proper and that the combination of the two is also proper. It performs this check when it receives an input signal on the STROBE line 32 from the protocol timing checker 31, which indicates that both ICHAR and FCHAR should, at that time, contain stable information. This strobe is derived from the transition from state B to state C in FIG. 6 and corresponds to the rise of FSTROBE in FIG. 2.

For most applications, the validation which is performed by character validator 41 can be a simple table look-up function which verifies that (1) ICHAR is a valid command, (2) FCHAR is a valid command, and (3) that the combination of ICHAR and FCHAR is valid.

Implementation of such checks is considered straightforward and ranges from direct logic comparison to the use of programmable logic arrays or read only memories. The latter approaches have the distinct advantage of allowing a single standard bus monitor basic structure to be designed, but used for many different systems by simply changing the programmable logic array or the read only memory. The character validator utilizing a read only memory would have a read only memory with at least a number of input address bits equal to the number of lines in the ICHAR and FCHAR buses and at least three outputs (three bits per word). Each word in the read only memory would correspond to a different ICHAR/FCHAR combination.

As pointed out previously, the output of the character validator has three signals to indicate various faults, namely, as invalid ICHAR, and invalid FCHAR, or an invalid combination of FCHAR and ICHAR. The last two cases represent situations where the follower module is at fault.

The outputs of the character validator and the protocol timing checker are combined in the OR circuits as previously described to indicate when the initiator module has failed and/or when the follower module has failed. If either of these signals is present, the bus reset line is raised to cancel the communication and force both modules into error recovery sequences. It should be especially noted that the only part of the bus monitor that need be changed for new application or modification from existing systems is the programming of the programmable logic array or the read only memory in the character validator and the rest of the unit would remain unchanged. Various modifications and changes to the basic bus monitor in FIG. 5 are easily provided to perform additional checks on the data communication. For example, if any of the standard error correcting and/or detecting codes are used to protect ICHAR and FCHAR, the read only memory or programmable logic array could be extended to have five outputs, with the additional two bits indicating faulty code on ICHAR and FCHAR respectively. This is a different situation from that involving an invalid ICHAR or FCHAR, because the table look-up for those lines would use the error correction codes to derive what ICHAR or FCHAR were meant to be. The faulty code lines will be programmed to rise whenever the code is not an error-free word, and the outputs of these two additional lines would be used to indicate potential module interface or bus faults.

Figure 7:
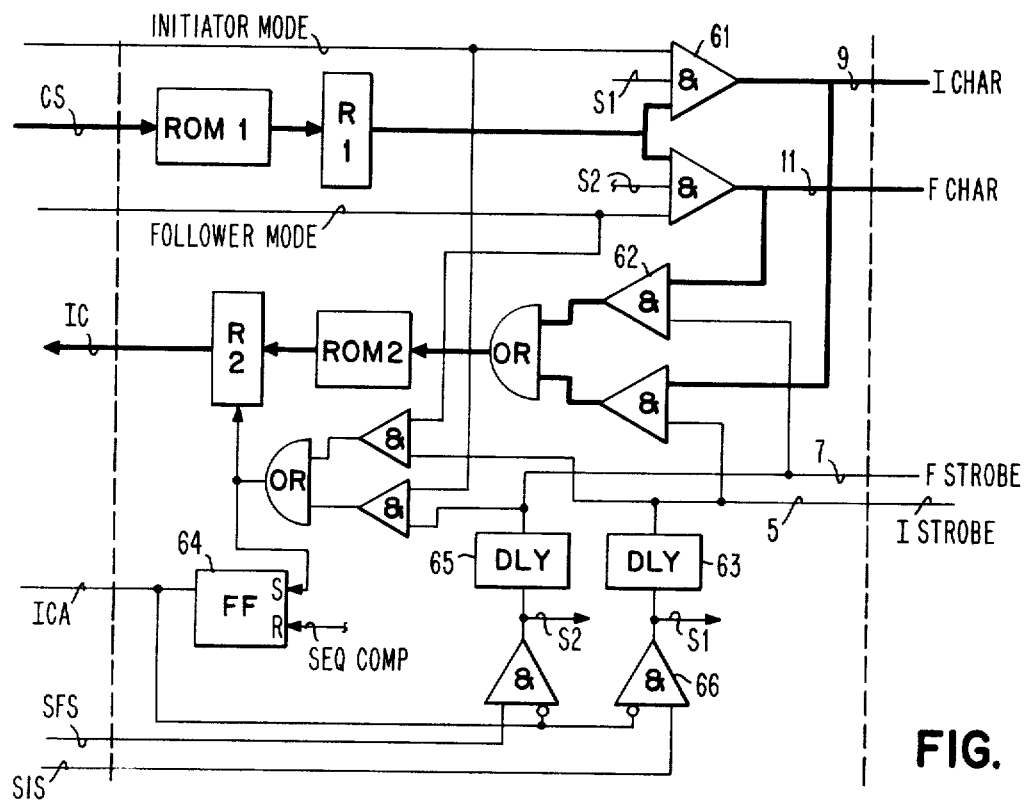
FIG. 7 is a block diagram illustrating one form of programmable interface unit according to the present invention.

As earlier pointed out, the bus structure according to the present invention is adapted for implementation utilizing a standard programmable interface unit that can be adapted to any device to be attached to a bus. The same design can be used not only with devices like a central processing unit that can themselves generate rather sophisticated commmunication sequences, but also as virtually an entire controller for a simple peripheral device. A general design of a programmable interface unit in accordance with the present invention is shown in FIG. 7. The design is based on the use of read only memories for the sake of clarity.

In addition to the ICHAR and FCHAR, FSTROBE and ISTROBE signals, the programmable interface unit also requires another set of signals interfacing the unit with the peripheral device with which it is associated. These latter signals consist of a signal selecting the type of operation for the unit, either initiator or follower mode, with the signal being designated as MODE; a character select signal CS comprising a set of lines indicating what character to output next; a signal to start an initiator sequence, designated as SIS; a signal to start a follower sequence, designated SFS; a signal indicating the last character to be received from the other module last involved in communication with the present module, designated as incoming character or IC. Also, there is a signal indicating that the character signal IC is valid, and is designated as incoming character available, ICA.

In the arrangement shown in FIG. 7, when a device is to become an initiator module, the MODE signal input to the programmable interface unit is set to the initiator mode, the CS or character select signal is set to a code that will select the desired ICHAR and the start initiator sequence signal SIS is raised to start the sequence. Under the control of CS, the output of read only memory ROM 1 will then be the desired ICHAR signals and these outputs will be gated into a register R1 and placed on the ICHAR bus since the line S1 will be up and will thereby enable the AND circuits 61. S1 is up because SIS is up and the output of flip flop 64 is down, at the inputs of AND circuit 66. After a short delay provided by delay circuit 63, to guarantee that ICHAR has become stable, ISTROBE comes up. When the follower module places FCHAR on the bus, an input is supplied to read only memory ROM 2, via AND gates 62, which converts FCHAR into whatever status representation is desired for the device in question. This is loaded into the register R2 where it is accessible to the associated peripheral device on the lines IC for incoming character. ICA rises to indicate the arrival of FCHAR, since Mode-Indicator is up and FSTROBE is up, providing a set signal for flip flop 64. The rise of ICA also causes ISTROBE to fall, thereby completing the initiator sequence, and resetting flip flop 64.

A follower sequence is similar. The device connected to the interface unit sets the mode line to the follower mode which gates ICHAR into ROM 2 for decoding. The rise of ISTROBE causes register R2 to be loaded and flip flop 64 to be set. After the device has performed its desired action, it places a code selecting the desired FCHAR on character select CS and raises the line SFS. This will cause S2 to rise and, after a short delay occasioned by delay circuit 65, FSTROBE will rise. Accordingly, FCHAR will be placed on the bus and FSTROBE will rise after a suitable time for FCHAR to become stable. The fall of ISTROBE will cause FSTROBE to drop. For either the initiator or follower mode, the ICA falls when the sequence is completed.

The use of read only memories in this application has several advantages. First, arbitrary translation between device dependent signals such as the character select and incoming character signals, and the actual character placed on the bus is possible. Secondly, the ability to define and standardize the meaning of bus characters without requiring changes to the devices connected to the programmable interface units. Third, the ability to add arbitrary error detecting and/or correcting codes to outgoing ICHARs and FCHARs and perform the equivalent decoding to incoming characters. This last feature can be implemented merely by increasing the size of the read only memories to generate and decode coded characters.

The arrangement shown in FIG. 7 also allows the output of read only memory ROM 2 to be fully or partially fed back to the other devices interface signals such as SIS and character select. This allows, for example, a programmable interface unit, once initiated, to go through a sequence of several character exchanges without requiring device interaction. Further, since what is read out of the read only memory ROM 2 is a function of both the mode and the incoming character, then what is sent out as the next character for this unit's half of the communication can also be a function of what the previous incoming characters were. Thus, complex communication sequences between interface units can be programmed into the units with little or no requirements for programmability in the devices with which they interface the bus system. Thus, by utilization of IC and CS, a programmable interface unit can be made into a relatively complete controller for a simple peripheral device. This will be described in more detail in connection with FIG. 8.

The programmable interface unit shown in FIG. 7 is modular in construction. The size of the read only memories is relatively arbitrary and can be adjusted to change the number of bits required to interface the device. The only constraints are that the number of bits per word in read only memory (ROM) 1 be at least equal to the number of bits in ICHAR and the number of address bits for ROM 2 equal to at least the number of bits in FCHAR. The number of words in ROM 1 or the number of bits per word in ROM 2 can be freely adjusted to match the requirements of the device with which the interface unit is to connect. As earlier described, the basic bus structure according to this invention can be extended by the addition of, for example, bus request and/or grant signals in multiinitiator systems, or wide data paths controlled by the basic bus structure. Such features are easily added to the basic programmable interface unit disclosed in FIG. 7. For example, a data bus can be controlled by a programmable interface unit by using some of the bits from the IC and CS signals to gate data into the data bus and take data off the bus.

Figure 8:
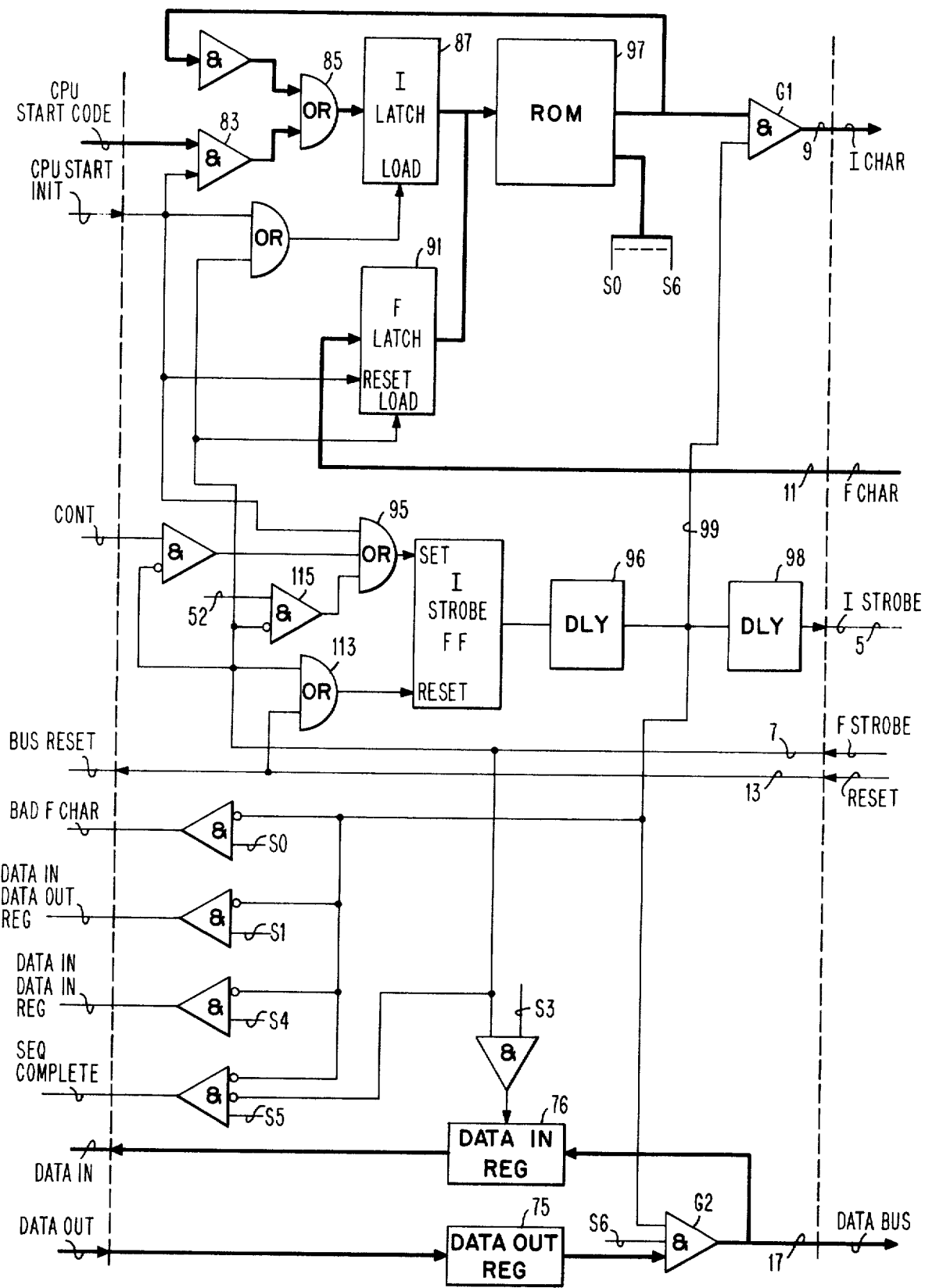
FIG. 8 is a detailed block diagram for a typical initiator module.

A more detailed arrangement for an initiator module in accordance with the present invention and having the above features is shown in FIG. 8 of the drawings, taken in connection with the following tables. Table No. 1 sets forth the designations for characters on the ICHAR and FCHAR buses for the sample transfer described in conjunction with FIG. 4, and Table No. 2 lists the matching read only memory programming for the read only memory utilized in connection with FIG. 8.

TABLE NO. 1

I1 - CPU AND ICHAR CODE FOR "READ-COMPUTE-WRITE-TAKE ADDRESS"
I2 - ICHAR CODE FOR "CONTINUE-READ-COMPUTE WRITE-SEND DATA"
I3 - ICHAR CODE FOR "FINISH READ-COMPUTE WRITE-DATA ON BUS"
F1 - FCHAR CODE FOR "READ-COMPUTE-WRITE START-ADDRESS TAKEN"
F1E - FCHAR CODE FOR 'SOMETHING IS WRONG WITH MY RECEPTION OF I1 ' - E.G. THAT MEMORY IS BUSY OR BROKEN
F1C - ICHAR CODE WAS INVALID TO FOLLOWER
F2 - FCHAR CODE FOR "DATA ON BUS"
F3 - FCHAR CODE FOR "DATA ACCEPTED-

TABLE NO. 1-continued

SEQUENCE COMPLETE"

TABLE NO. 2

| ADDRESS | OUTPUT ICHAR | S0 | S1 | S2 | S3 | S4 | S5 | S6 |
|---------|--------------|----|----|----|----|----|----|----|
| (I1,0)  | I1           | 0  | 0  | 0  | 0  | 0  | 0  | 1  |
| (I1,F1E)| —            | 1  | 0  | 0  | 0  | 0  | 0  | 0  |
| (I1,F1) | I2           | 0  | 0  | 1  | 1  | 0  | 0  | 0  |
| (I1,F1C)| —            | 1  | 0  | 0  | 0  | 0  | 0  | 0  |
| (I2,F2) | I3           | 0  | 1  | 0  | 0  | 1  | 0  | 1  |
| (I3,F3) | —            | 0  | 0  | 0  | 0  | 0  | 1  | 0  |

S0 = 1 IF FCHAR IS IN ERROR
S1 = 1 IF INITIATOR WISHES CPU TO PLACE DATA IN DATA OUT REGISTER AND THEN RAISE CONTINUE
S2 = 1 IF INITIATOR IS FREE TO CONTINUE WITH NEXT ICHAR WITHOUT CPU INTERVENTION
S3 = 1 IF INITIATOR IS TO ENABLE "DATA IN REGISTER" TO ACCEPT DATA BUS WHEN FSTROBE RISES
S4 = 1 IF "DATA IN REGISTER" HAS DATA IN IT
S5 = 1 IF SEQUENCE IS COMPLETE
S6 = 1 IF DATA IS TO BE OUTPUT FROM INTIATOR

Figure 9:
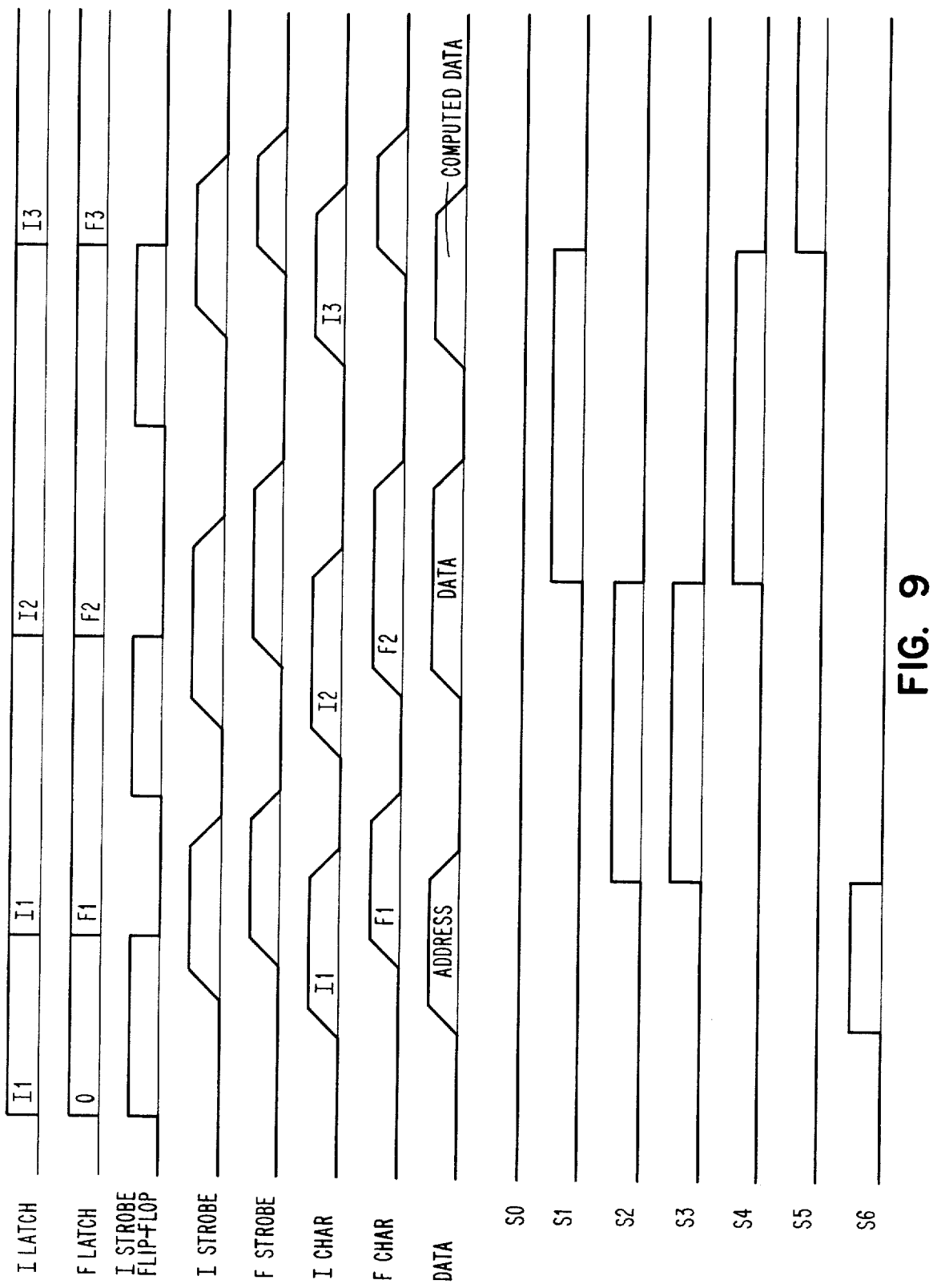
FIG. 9 is a timing diagram for an operating cycle of the arrangement shown in FIG. 8.

A description of the arrangement shown in FIG. 8 will be enhanced by describing its operation during a typical operating cycle, in connection with a timing diagram for the sample cycle as shown in FIG. 9 of the drawings.

At the start of the cycle, the CPU places code for the operation "read-compute-write-start" on the input lines to the initiator module, and places the address data into a data out register 75, with an input code equal to I1. In the next step, the CPU raises the start initiator line 81, thereby latching the CPU start code into the I latches 87 by way of the AND circuits 83 and OR circuits 85, the outputs of which are connected to the inputs of I latches 87. At the same time, the F latch 91 is reset by the signal on line 81, and the ISTROBE flip flop 93 is set from line 81 via OR circuit 95. As a result of an I1 in ILATCH and a 0 in FLATCH, the (I1,0) word will be read out of ROM 97.

The rise of the ISTROBE flip flop initiates a delay in the delay unit 96, sufficient in time to permit the outputs of I latch 87 to access the read only memory 97.

At the end of this delay time, a signal is provided on line 99 to enable AND circuits G1 and G2. With these circuits enabled, the ICHAR and data sub-buses will transmit the I1 code and the address respectively. AND circuit G2 will be active at this time since the output S6 will be provided from ROM 97.

After another short delay, an output will be provided from delay unit 98, causing the ISTROBE line 5 to rise. This delay time is provided in order to allow the signals on the ICHAR and data sub-buses to stabilize.

The initiator now waits for the follower module to respond by accepting the address and returning an FCHAR signal. If all operations are correct, the FCHAR signal is equal to F1. If the memory is broken or malfunctioning, for example, it would return a different FCHAR code, such as F1E or F1C, or if the follower is broken, the bus monitor would time out. It will be assumed, however, that in the present instance, the FCHAR bus 11 will carry the F1 code. At this time then, the follower module places the F1 code on the FCHAR bus equivalent to saying that the address has been accepted and that the initiator sould proceed. Thereafter, the FSTROBE bus 7 is raised.

On the rise of FSTROBE, the contents of the ICHAR and FCHAR sub-buses are latched into the I latches and F latches, and the ISTROBE flip flop 93 is reset by a signal from the FSTROBE bus supplied via the OR circuit 113.

Then after a delay equal to he access time for the ROM 97, provided by the delay 96, the signal on line 99 is lowered so that gates G1 and G2 are disabled. Also at this time, the status signals S0 through S5 are enabled as outputs of the read only memory 97 at word (I1,F1) and the delay time to drop the ISTROBE bus signal is started.

After a delay provided by the delay 98, the ISTROBE signal on line 111 falls, causing the follower module to eventually drop FCHAR and FSTROBE.

At this time, a high value for S2 at the input of an AND circuit 115 will set the ISTROBE flip flop 93 when FSTROBE falls. This indicates that the programming of the initiator is such that it is allowed to send the next command without CPU intervention.

After the time delay imposed by delay 96, line 99 will be raised and the output of the read only memory 97, now from word (I1,F1), is available and I2 is gated onto bus ICHAR via the AND gates G1 in a manner similar to that previously described for I1. In this instance, I2 is a code designating "read-compute-write-send data".

After a delay imposed by delay 98, the ISTROBE line 5 will rise and the system now will wait for action upon the part of the follower module.

The follower module at this time will place the code F2 on the FCHAR bus, F2 designating "data on bus". Also, it places the required data word on the data bus, and thereafter raises FSTROBE. Since signal S3 is active, this data is latched into the data in register 76.

Rise of FSTROBE latches I2 and F2 into the I and F latches and resets the ISTROBE flip flop. After a delay imposed by delay 96, G1 is deactivated and status signals S1 and S4 are supplied from the ROM to the central processing unit. The rise of the signal S4 to the CPU signals the CPU that the data in register 76 has a memory word in it. The rise of S1 tells the CPU that the initiator will now wait for the CPU to return the data word.

AFter the delay imposed by delay 98, the ISTROBE bus falls and causes the follower module to drop FSTROBE, FCHAR and the data sub-buses.

Meanwhile, the central processing unit removes the data from the data in register, modifies it and places the resulting data back into the data out register 75. It then raises continue signal line CONT which sets the ISTROBE flip flop via the OR circuit 95. The flip flop is set only after FSTROBE falls, to eliminate invalid sequences if the CPU is faster than the follower module.

AFter the delay imposed by delay unit 96, I3 (from ROM word (I2,F2)) is gated through the AND circuits G1 to the ICHAR bus, and signal S6 enables the AND circuits G2 to read out the data from the data out register to the data sub-bus. After delay imposed by delay 98, the ISTROBE bus rises, which causes a follower module to accept I3 and later write back data into memory. The follower module then places the code F3 on the FCHAR bus, designating that the data has been taken back, and raises the FSTROBE sub-bus.

Rise of FSTROBE sub-bus resets ISTROBE flip flop and latches the codes I3 and F3 into the I latches and F latches so that word (I3,F3) will be read from the ROM. After delay due to delay unit 96, the AND circuits G1 and G2 are disabled, and after delay due to unit 98, ISTROBE bus drops. After the fall of ISTROBE bus, the follower module drops FCHAR and FSTROBE, and when FSTROBE falls, it enables the transmission of S5, designating sequence complete to the central processing unit.

Figure 10:
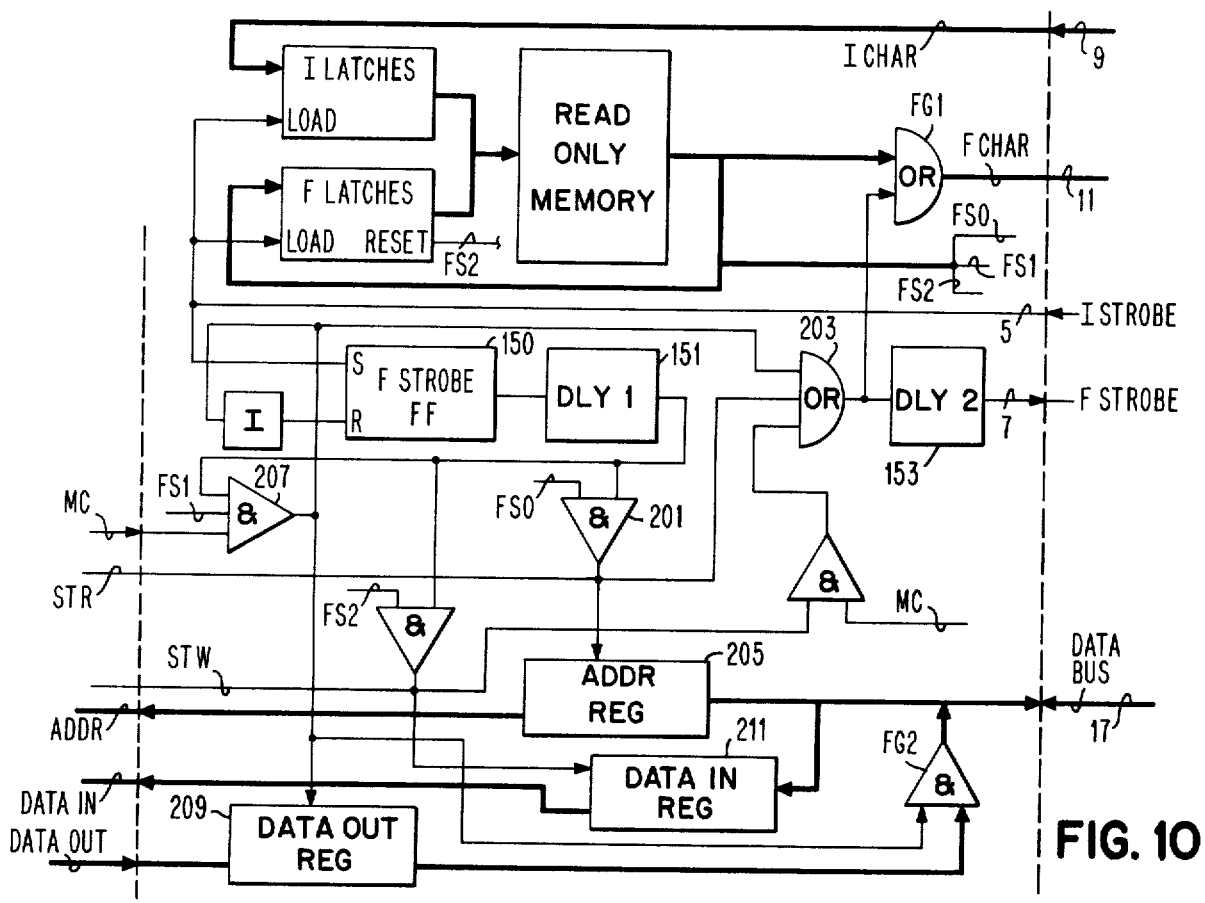
FIG. 10 is a detailed block diagram for a typical follower module.
Figure 11:
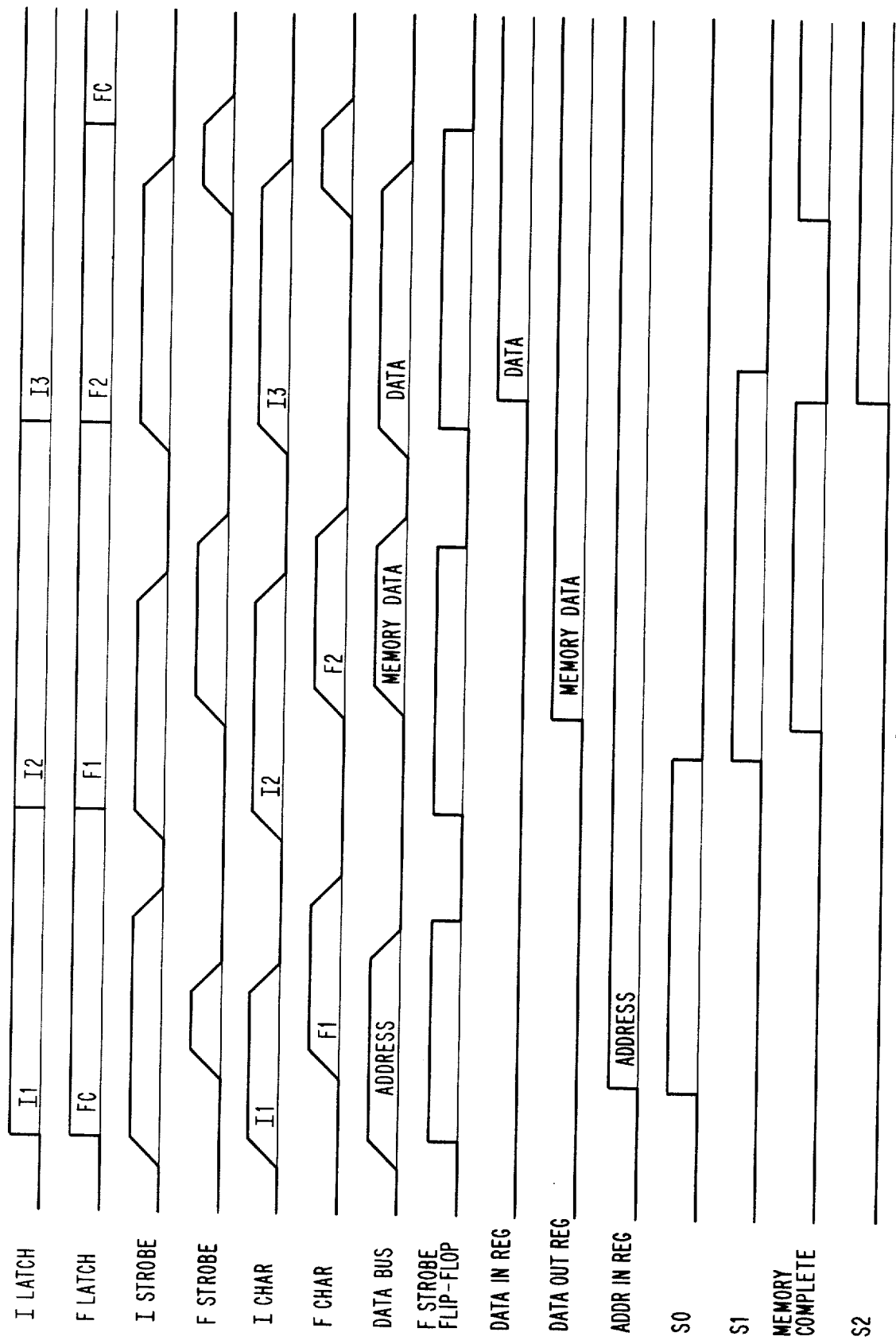
FIG. 11 is a timing diagram for an operating cycle of the arrangement shown in FIG. 10.

Having thus described the operation of the initiator module, consideration will now be given to the structure and operation of a typical matching follower module shown in FIG. 10, taken in connection with the timing diagram of FIG. 11, and the following Table No. 3 showing a partial listing of the follower module ROM coding.

TABLE NO. 3

| INPUT | FCHAR OUTPUT | FS0 | FS1 | FS2 |
|---|---|---|---|---|
| (I1,FC) | F1 | 1 | 0 | 0 |
| (I2,F1) | F2 | 0 | 1 | 0 |
| (I3,F2) | F3 | 0 | 0 | 1 |

In connection with the following description, the following meanings are attached to the output status signals for the read only memory of the follower module: FS0 designates latch address register, raise FSTROBE, start read; the signal FS1 designates wait for memory complete, then load the data out register from memory, enable FG1 and FG2 gates, and then raise FSTROBE; the designation FS2 means clock data into data in register, raise the start write signal line to memory, wait for memory complete before raising FSTROBE, then reset F latch.

The description assumes that previous sequence is completed successfully and the FCHAR ROM output is FC, designating sequence complete. Also, it is assumed that the sequence described below is at the follower end of the sample "read-compute-write" sequence, and that the follower module is connected to a memory device.

The operating cycle starts by the initiator placing a code I1 on ICHAR, the address on the data bus and raising ISTROBE.

The rise of ISTROBE loads the code I1 and FC into the I latches and F latches respectively. It also sets the FSTROBE flip flop 150 which, in turn, starts the timing delay interposed by the delay unit 151. At the end of this delay time, the signal FSO is present at the output of the read only memory from word (I1,FC), and an AND circuit 201 is enabled, and via an OR circuit 203 enables the AND circuits FG1 to place the output of the read only memory on the FCHAR bus. Also, the address register 205 is enabled to receive data from the data bus 17 at this time. The output of OR circuit 203 starts the delay imposed by delay unit 153, and at the end of that time, FSTROBE line 7 rises.

When the initiator module sees the rise of FSTROBE, it removes the address from the data sub-bus 17, removes the code I1 from the ICHAR sub-bus 9 and drops the ISTROBE line 5.

The fall of ISTROBE resets the FSTROBE flip flop 150 which, in turn, disables the output AND gates FG1 and drops the FSTROBE sub-bus 7.

The initiator module now places the code I2 on the ICHAR sub-bus 9 and raises ISTROBE line 5. I2 is now loaded into the I latches and the FSTROBE flip flop 150 is set which, in turn, starts another cycle of delay 151. Line FS1 will come up at the output of the ROM at this time which, in turn, checks to see if the memory read is complete. When memory is complete, the AND circuit 207 is enabled by raising of the line MC, and the output of AND circuit 207 loads the data out register 209 with data out from the memory. Gates FG1 are enabled via OR circuit 203, and gates FG2 are also enabled at this time to place the data from the data out register on the data bus 17. After the delay imposed by delay unit 153, FSTROBE rises. When the initiator sees the rise of FSTROBE, it takes the data word off the data sub-bus, drops the ICHAR sub-bus and drops the ISTROBE sub-bus.

At the fall of ISTROBE, the follower module resets the FSTROBE flip flop 150, disables FG1 and FG2, dropping the data sub-bus 17 and FCHAR and then drops FSTROBE sub-bus 7.

When the initiator module is given data to be written back into memory, it takes the following actions: places the data on the data sub-bus, places the code I3 on the ICHAR sub-bus and raises ISTROBE. Another subcycle now takes place as described above in which the information is loaded into the I and F latches and the FSTROBE flip flop 150 is set to start the cycle of placing the data on the FCHAR sub-bus 11. At the end of the delay imposed by delay 151, the ROM output is available at line FS2 which clocks the data sub-bus into the data in register 211 and places a signal on line STW which instructs the memory to start a write cycle.

When memory starts the write cycle, the memory complete line MC falls, and when the write is completed, the line MC rises which, in turn, enables the gates FG1 and brings up the FSTROBE sub-bus.

At this time, the initiator will remove the information from the data sub-bus, remove the code from the ICHAR and drop ISTROBE. Now the fall of ISTROBE resets the FSTROBE flip flop 150, disables G1 and drops FSTROBE. Also, the F latches will e reset to FC, designating that the follower has completed its cycle.

Figure 12:
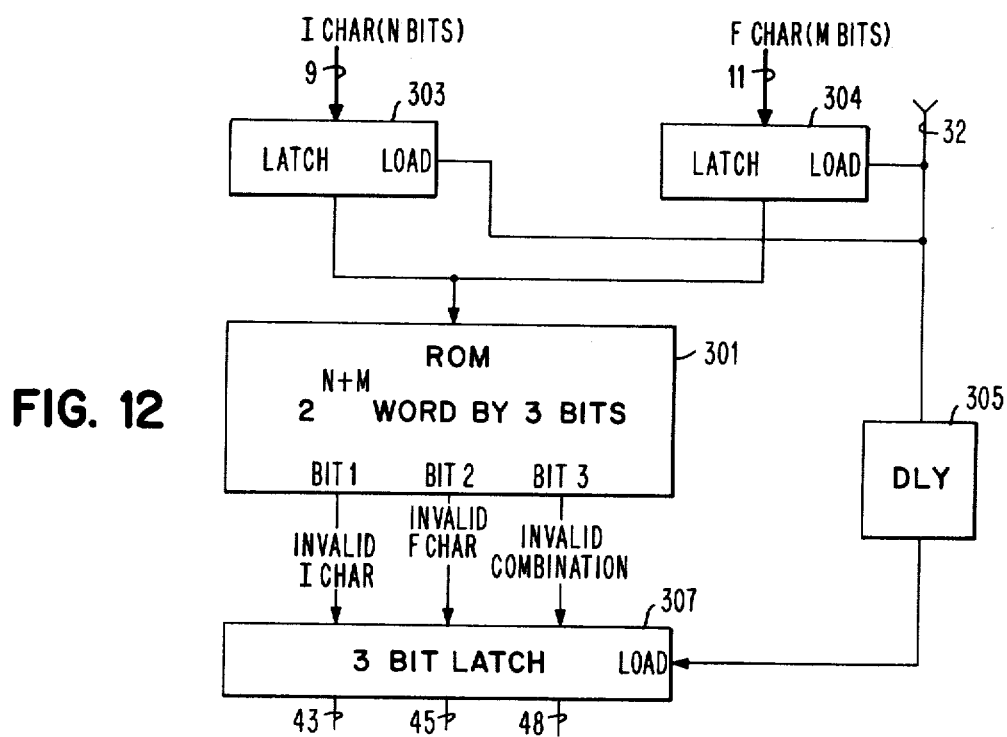
FIG. 12 is a block diagram of one arrangement which may be used as a character validator of FIG. 5.

In connection with FIG. 5 of the drawings, the bus monitor was described as including a character validator 41. FIG. 12 of the drawing shows one arrangement which may be used to carry out the function of the character validator unit shown and described in connection with FIG. 5. As shown in FIG. 12, the basic unit involved in the character validator is a read only memory, ROM, designated by reference character 301. In the present instance, it is assumed that the ICHAR data comprises N bits of information while the FCHAR data comprises M bits of information. Accordingly, the memory 301 is selected to have $2^{N+M}$ words by three bits. Bit 1 is designated as the invalid ICHAR indication, bit 2 as the invalid FCHAR indication, and bit 3 is designated as the invalid combination of the ICHAR and FCHAR data.

The apparatus includes a set of latches 303 connected to the ICHAR sub-bus and a set of latches 304 connected to the FCHAR sub-bus. The outputs of the latches are loaded into the ROM 301 upon receipt of the STROBE signal on line 32 from the protocol timing checking circuits to be subsequently described. At this time, the inputs to the ROM will cause outputs to be provided from the ROM in accordance with the combinationof the input data and the programmed arrangement of the read only memory. After a delay imposed by the delay device 305, the output data in the three bit latch circuits 307 is provided on the lines 43, 45 and 47, as explained in connection with FIG. 5. In any event, a character validator as shown in FIG. 12 would utilize an ROM with at least the number of input address bits equal to the number of lines in the ICHAR and FCHAR sub-buses and having at least three outputs, that is, three bits per word, each word in the ROM corresponding to the different ICHAR/FCHAR combinations.

Figure 13:
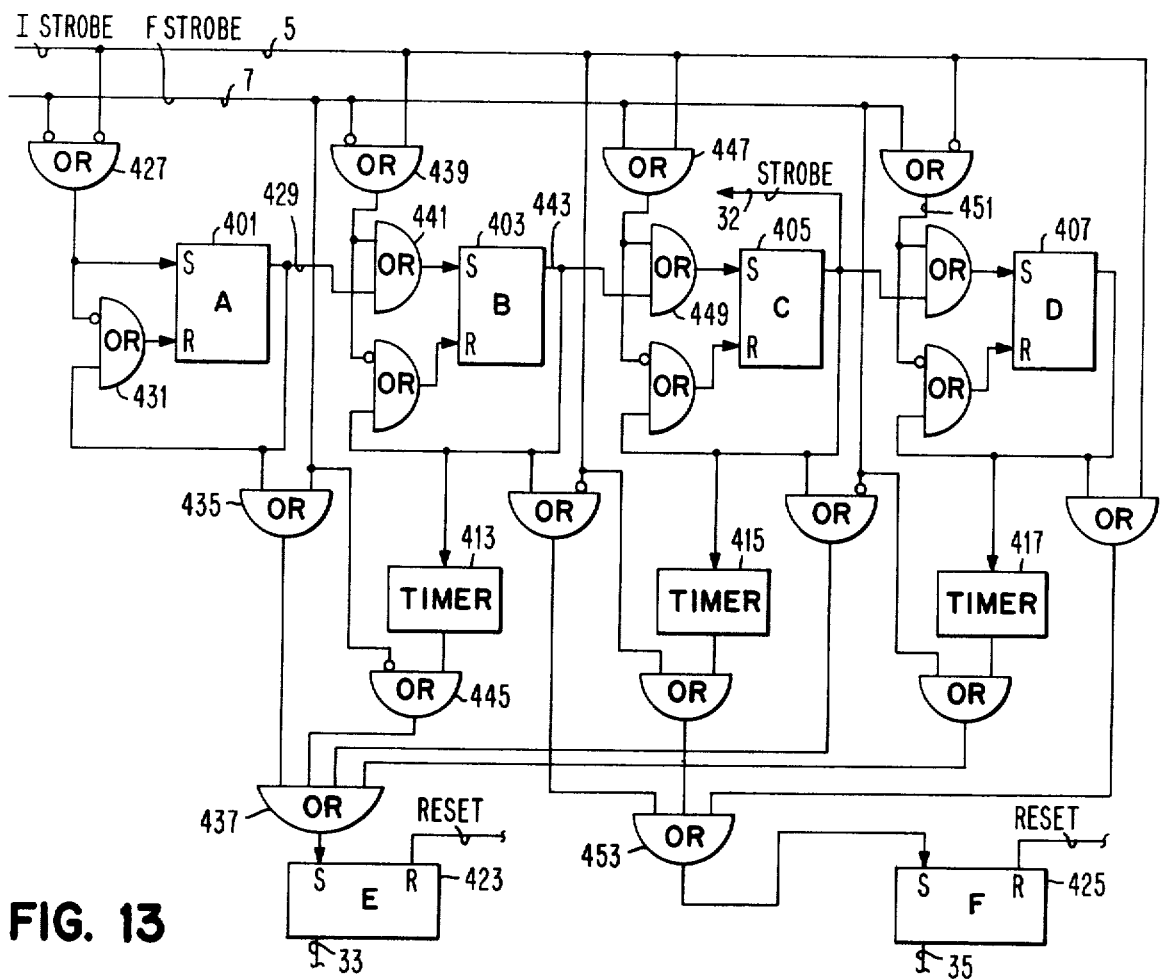
FIG. 13 is a block diagram of one arrangement which may be used as a protocol timing checker of FIG. 5.

FIG. 13 of the drawings shows one arrangement which may be used in the protocol timing checker 31 shown and described in connection with FIG. 5. The apparatus includes four flip flops or bistable devices 401, 403, 405 and 407, which will respectively indicate the states A, B, C and D of the state diagram shown in FIG. 6. The flip flops are connected to the ISTROBE and FSTROBE lines 5 and 7 and also to any preceding flip flop in such manner that the total operation checks that the ISTROBE and FSTROBE sub-buses operate in the proper sequence as shown in FIG. 6. If the sequence is not observed, suitable indications are provided. Considering state A, this is the condition where both the ISTROBE and FSTROBE buses 5 and 7 are down and, under these circumstances, the AND circuit 427 provides an output to the set input of flip flop 401. This turns on flip flop 401 to indicate the A state of the sub-buses. The output therefrom on a line 429 is returned to one input of an AND circuit 431 and, when the inputs to AND circuit 427 change, 431 will be enabled to reset the flip flop 401. The output of 401 on line 429 is also supplied as one input to an AND circuit 435, the other input of which is connected to the FSTROBE bus 7.

If, at this time, the FSTROBE sub-bus should come up, the other input to AND circuit 435 will be enabled, and its output will be supplied via an OR circuit 437 to set latch 423 on, thereby providing an output on line 33 indicating a follower fault.

However, if the sequence is properly followed, and the ISTROBE sub-bus 5 comes up while FSTROBE 7 is down, then an input will be provided to each of the inputs of the AND circuit 439, the output of which will be supplied to one input of an AND circuit 441, the other input of which is the line 429. Since the flip flop 401 would be on at this time, then the flip flop 403 will be set on. As previously pointed out, the flip flop 401 will now be turned off since the reset signal will be supplied via AND circuit 431 with the rise of the ISTROBE line. Flip flop 403, being on, signals that the transition to state B was accomplished successfully as indicated by an output on the line 443.

An output on line 443 sets up the resetting circuit for flip flop 403 in the same fashion as the one previously described for flip flop 401. Also, an output on line 443 initiates the operation of a timer 413 and, if the FSTROBE line is down at the time that timer 413 times out, then an output will be provided from the AND circuit 445 and via OR circuit 437 to turn on the follower fault latch 423. This operation corresponds to a change of state from B to E as shown in FIG. 6.

With line 443 up, if both ISTROBE and FSTROBE come up, the inputs are supplied via an AND circuit 447 to one input of an AND circuit 449, the other input of which is supplied by line 443. The output of circuit 449 sets the flip flop 405 representing state C in its ON condition.

An output accordingly will be present on line 451 at this time, which is connected to the STROBE line 32 utilized to enable the character validator circuitry previously described. The time 415 will provide a time out feature following state C which will cause a transition to state F, as shown in FIG. 6.

When the ISTROBE line or bus goes down, with FSTROBE up, and with line 451 up, a circuit obvious from the drawing will be supplied to the flip flop 407 representing condition D. The time out feature provided by the timer 417 is governed by the output of flip flop 407 and, if time out occurs, an input to the latch 423 is supplied via the OR circuit 437.

From state D, the proper transition is back to state A with both of the ISTROBE and FSTROBE sub-buses down.

Time out conditions are supplied from timers 413 and 417 to provide a follower fault condition "E" output 33, while the output of timer 415 provides an initiator fault condition via OR circuit 453, latch 425 and line 35.

All of the various state and transition checks afforded by the apparatus of FIG. 13 will be apparent from a consideration of the circuit of FIG. 13 taken in connection with FIG. 6.

From the foregoing it will be apparent that the present invention provides an improved data communication bus structure incorporating novel means for checking the correct operation, and a novel interface unit for use in connection therewith.

While the invention has been particularly shown and described with reference to a preferred embodiment thereof, it will be understood by those skilled in the art that various changes in form and details may be made therein without departing from the spirit and scope of the invention.

I claim:

1. In a digital data communication system having at least one initiator module and at least one follower module connected by an information data bus over which information is transmitted between the initiator module and the follower module, control signal transfer means for transferring control signals between said initiator module and said follower module, comprising, in combination, an initiator character bus,
a follower character bus,
an initiator strobe bus,
a follower strobe bus,
said character and stobe buses being connected to said initiator and said follower modules,
first signal generating means in said initiator module and connected to said initiator character bus for generating an initiator character signal on said initiator character bus, the initiator character signal comprising control signals to control the subsequent operation of the follower module on information data supplied from said initiator module to said follower module on said information data bus,
second signal generating means in said initiator module for generating an initiator strobe signal on said initiator strobe bus after a predetermined time delay following the beginning of said initiator character signal,
first signal receiving means in said follower module connected to said initiator character bus for receiving the initiator character signals and providing control signals to control the handling of information data received by said follower module from said data information bus,
second signal receiving means in said follower module connected to said initiator strobe bus for receiving the initiator strobe signals,
first gating means connected to said first and said second signal receiving means for rendering said first signal receiving means effective to receive said initiator character signals only when said initiator strobe signals are present on said initiator strobe bus,
third signal generating means in said follower module and connected to said follower character bus for generating a follower character signal on said follower character bus, the follower character signal comprising control signals to control the subsequent operation of the initiator module on information data supplied from said follower module to said initiator module on said information data bus,
fourth signal generating means in said follower module and connected to said follower strobe bus for generating a follower strobe signal on said follower strobe bus after a predetermined time delay following the beginning of said follower character signal,
third signal receiving means in said initiator module connected to said follower character bus for receiving the follower character signals and providing control signals to control the handling of information data received by said initiator module from said data information bus,
fourth signal receiving means in said initiator module connected to said follower strobe bus for receiving the follower strobe signals, and
second gating means connected to said third and said fourth signal receiving means for rending said third signal receiving means effective to receive said follower character signals only when said follower strobe signals are present on said follower strobe bus.

2. A digital data communication system as claimed in claim 1, further characterized by an independent bus monitor comprising combination checking means for comparing the format of control data on said initiator and said follower module character buses with standard formats and providing a first alarm signal if a discrepancy exists, and sequence checking means for checking the sequence in which signals appear on said buses, and providing a second alarm signal if an incorrect sequence occurs.

3. A digital data communication system as claimed in claim 2, further characterized by alarm indicating means connected to said combination checking means and said sequence checking means for supplying an alarm indication upon occurrence of either one or both of said first and said second alarm signals.

* * * * *